United States Patent [19]

Smith et al.

[11] 4,122,030

[45] Oct. 24, 1978

[54] FORMATION OF COLLOIDAL DISPERSIONS OF SELENIUM BY THE LOCUS CONTROL METHOD

[75] Inventors: Thomas W. Smith, Penfield; Wolfgang H. H. Gunther, Webster, both of N.Y.

[73] Assignee: Xerox Corporation, Stamford, Conn.

[21] Appl. No.: 834,611

[22] Filed: Sep. 19, 1977

[51] Int. Cl.² .............................................. B01J 13/00
[52] U.S. Cl. ................................ 252/313 R; 96/1.5 R; 252/309; 252/501
[58] Field of Search .............. 252/313 R, 501; 96/1.5; 423/510

[56] References Cited

U.S. PATENT DOCUMENTS 3,130,012  4/1964  Prater et al. .......................... 423/510
3,962,113  6/1976  Schiessl et al. ....................... 252/188

Primary Examiner—Richard D. Lovering

[57] ABSTRACT

The present invention is a method for preparing a colloidal dispersion of selenium by the locus control process. In one embodiment the method involves adding hydrazine to a solution containing submicron sized domains of a soluble second phase which domains bear a plurality of pendant acid groups to form a salt between the hydrazine and pendant acid groups. Addition of selenous acid to the solution results in reduction of the selenium contained therein to zero valent selenium which selenium is produced in the form of a stable colloidal dispersion.

6 Claims, No Drawings

FORMATION OF COLLOIDAL DISPERSIONS OF SELENIUM BY THE LOCUS CONTROL METHOD

BACKGROUND OF THE INVENTION

This invention relates to the art of electrostatographic copying and more specifically to a method of preparing stable dispersions of selenium which can be cast into thin films. The art of electrostatographic copying, originally disclosed by C. F. Carlson in U.S. Pat. No. 2,297,691, involves as an initial step, the uniform charging of a plate comprised of a conductive substrate normally bearing on its surface a non-conductive barrier layer which is covered by a layer of a photoconductive insulating material. This is followed by exposing the plate to activating radiation in imagewise configuration which results in dissipation of the electrostatic charge in a pattern known as the latent image. The latent image is developed by contacting it with an electroscopic marking material commonly referred to as toner. This material is electrostatically attracted to the latent image which is, by definition, in the configuration of those portions of the photoreceptor which were not exposed to the activating radiation. The toner image may be subsequently transferred to paper and fused to it to form a permanent copy. Following this, the latent image is erased by discharging the plate and excess toner is cleaned from it to prepare the plate for the next cycle.

A photoconductive material which has achieved considerable commercial success is amorphous selenium. This material is applied to the conductive substrate by vapor deposition techniques which provide the desired photosensitive plate. Trigonal selenium in a binder matrix may also be used in some cases. A less expensive way to apply a layer of selenium would be to cast the layer from a colloidal dispersion of selenium. Such a process is problematical, however, because of the difficulties encountered in forming stable colloidal dispersions of selenium at reasonable selenium concentrations.

Colloidal dispersions of selenium have been prepared by reacting hydrazine with selenous acid in an aqueous solution containing gelatin. The preparation of monodisperse selenium sols formed on gold nucleation sites is reported in the *Journal of Colloidal and Interface Science*, Symposium Issue, pp. 227–235, June 1968. Those dispersions are, however, of very low concentration which renders their use in practical applications problematical.

It is known that hydrazine will react with selenous acid to form zero valent selenium by the reaction:

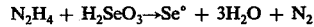

This reaction, when carried out in aqueous solution, does not normally provide stable, colloidal dispersions of selenium due to the tendency of the selenium to flocculate out of the medium.

It would be desirable and it is an object of the present invention to provide a novel process for the formation of stable, colloidal dispersions of selenium.

Another object is to provide such a process in which colloidal concentrations containing up to 25 weight percent selenium and greater can be formed.

A further object is to provide such a process in which the selenium is formed by the reduction of selenous acid or an alkyl selenite by hydrazine or a substituted hydrazine.

SUMMARY OF THE INVENTION

The present invention is a method for the formation of stable, colloidal dispersions of selenium. The method comprises the steps of:

(a) providing a solution of a solvent containing submicron domains of a soluble second phase, said second phase domains containing a plurality of pendant groups capable of reducing selenous acid to selenium;

(b) adding selenium acid or an alkyl selenite corresponding to the formula:

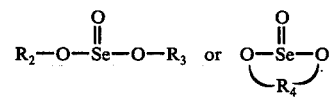

wherein $R_2$ and $R_3$ are independently H or alkyl of 1 to 20 carbon atoms and $R_4$ is alkylene of 1 to 20 carbon atoms to the solution to reduce the selenium in the selenous acid or alkyl selenite to zero valent selenium and thereby form a stable colloidal dispersion of selenium.

DETAILED DESCRIPTION AND PREFERRED EMBODIMENTS

The method of this invention employs the locus control process for the preparation of colloidal dispersions of Se°. In general, the locus control process involves a chemical reaction occurring in a discrete domain, e.g. macromolecules or surfactant micelles, different from the bulk reaction medium with at least one of the participating reagents being bound in the domain. By-products of the reaction are preferably those species which can be removed from the reaction medium without undue processing.

In one embodiment, the present invention extends the known ability of hydrazine and certain hydrazine derivatives to reduce the selenium in selenous acid and certain alkyl selenites to zero valent selenium. By forming the free selenium in the proximity of micellar or macromolecular species, it is bound to these discrete domains, and, because of the solubility of these domains in the bulk medium, stable, colloidal dispersions of selenium result.

The first step of the process is to provide a solution containing a soluble second phase. The second phase comprises soluble domains bearing functional groups necessary for the desired reaction to proceed so that the reaction products are created only at the sites at which they are stabilized. The second phase normally comprises polymer molecules in solution or surfactant molecules in concentrations above their critical micelle concentration. The domain size range is submicron and preferably from 50 Å to 500 Å. These domains act as mini reaction vessels and if they have the right functionality, a specific reaction can be caused to occur at a specific site. The functional groups of the domain are in the form of pendant species of the desired reactivity. The pendant groups can be anionic or cationic so as to form salts with materials capable of reducing selenous acid to selenium. Thus, when the pendant groups are acidic, hydrazine can be added to the solution to form a salt which acts as the reducing agent. Alternatively the pendant groups can be cationic and a reducing salt formed by adding an anionic species such as $HSO_3^-$, HSe⁻ or $H_2PO_2^-$ to the solution. Alternatively the pendant groups can be species which are themselves oxidizable by selenous acid as would be the case with a polymer having pendant ascorbic acid, oxime, aldehydric, acyl hydrazine, acyl hydrazone or hydrazine residues.

One type of second phase domains useful in the instant invention contain a plurality of acidic groups. The acidic groups are selected from those acids which have a pK less than 6, i.e. sufficiently strong to donate a proton to hydrazine or a derivative thereof. Thus, in one embodiment of the invention, hydrazine is added to an aqueous solution of poly(acrylic acid) to form a hydrazine/poly(acrylic acid) salt:

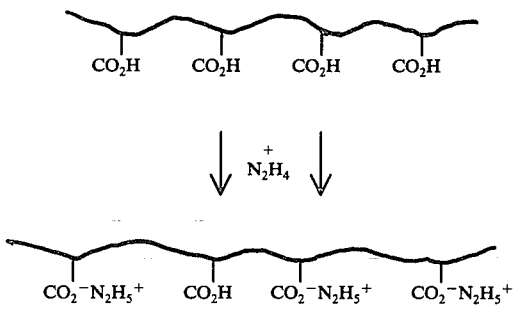

It has been found that hydrazine in the form of its protonated salt will reduce selenous acid just as will free hydrazine. It has also been found, however, that the reduction of selenous acid does not proceed well if 100% of the carboxyl groups of the poly(acrylic acid) are substituted with hydrazine. This is probably the case because selenous acid is not easily reduced in a neutral or basic solution, and slight acidity, most easily provided by leaving a portion of unsubstituted acidic groups in the domain, is necessary. It has also been found that providing a 75% $N_2H_4$ substituted poly(acrylic acid) in water solution and adding selenous acid thereto can provide a stable dispersion of approximately 1000 Å selenium particles. These particles have been grown to about 2000° cyclicly recharging the reaction medium with selenous acid. As the process is carried out, the hydrazine is decomposed to nitrogen gas and the acid group is regenerated thereby allowing one to add additional hydrazine and a new charge of selenous acid thereby incorporating more and more selenous acid into the polymer. As hydrazine and selenous acid are added, aqueous dispersions of amorphous selenium are formed which are bound to the domains. The domains tend to sterically stabilize the dispersion. This prevents the agglomeration of particles and their resultant flocculation. By forming the selenium in intimate contact with the domain, stabilization occurs at the point of nucleation and a stable colloidal dispersion is provided. Unstabilized colloidal dispersions of selenium, on the other hand, tend to flocculate out of a water dispersion due to the tendency of the individual particles to agglomerate.

The invention has been described as employing poly(acrylic acid) as the soluble, second phase material. Other polymers containing a plurality of free carboxylic acid groups may be used such as copolymers of acrylic and methacrylic acid and styrene, homo and copolymers of unsaturated carboxylic acids such as maleic acid, fumaric acid, itaconic acid, vinyl acetic acid, etc. In addition, polymers containing free sulfonic acid groups such as poly(2-methyl-2-acrylamido-propanesulfonic acid), p-styrene sulfonic acid; vinyl sulfonic acid, etc. may be used in this embodiment. Polymers containing pendant acid groups other than carboxylic and sulfonic may be used provided the acid has a sufficiently low pK to donate a proton to the hydrazine.

Any combination of solvent and polymer (domain) may be used so long as the domain interacts more strongly with the selenium particle than does the solvent. Water is the easiest solvent to use because the differential between the interactions is great, however, organic solvents such as alcohols, ethers, hydroxy ethers, and toluene can be used as long as the domain is soluble therein.

In addition to acidic polymers, a surfactant micelle, e.g. sodium lauryl sulfate, will provide a reactive domain of the appropriate size. Micelles are molecular aggregates formed in solutions of detergents—molecules in which a non-polar tail is joined to a polar head. Such molecules are also called amphiphilies, surfactants and surface active molecules. These may have reducing species bonded to them as in the case of polymeric domains.

Unsubstituted hydrazine is preferred for use in the present invention since the by-products of its reaction with selenous acid are easily removed. Hydrazine derivatives corresponding to the formula:

$$RHN-NR_1H$$

are also suitable. In the above formula, R and $R_1$ are independently hydrogen, phenyl or alkyl. The length of the alkyl chain is limited only in that too long a chain will only serve to introduce unnecessary, possibly detrimental, by-products into the reaction mixture. Typically R and $R_1$ will represent alkyl chains of from 1 to 20 carbon atoms in length. In addition to selenous acid, di- or mono-alkyl selenites may be used since such selenites can be reduced. An advantage of the use of diselenites is that they can be reduced under neutral and basic as well as acidic conditions and can be more readily soluble in organic media. Cyclic derivatives of selenous acid may also be used.

The locus control method for forming selenium which is disclosed herein permits the formation of colloidal dispersions of selenium containing high (typically from 10 to 25 weight percent) concentrations of selenium. Attempts to form colloidal dispersions of selenium in the absence of a locus control site result in selenium dispersions which flocculate. This is the case, for example, when propionic acid monomer is added to the reaction medium in an amount equivalent to the concentration of carboxylic groups borne by poly(acrylic acid) used in the following examples. The higher concentration of selenium in dispersion allowed by the present invention provides a significant advantage in film casting. In those dispersions where the concentration of selenium is 1% or less, there is too much carrier liquid present for the efficient casting of films. A dispersion containing up to 25% selenium is much more efficient for the casting of film and the locus control method of forming such dispersions provides for their direct preparation in a controlled manner. By controlling the number of domains one can control the number of particles that nucleate and by controlling the amount of selenous acid (selenium precursor) one can control the size to which the selenium particles are grown.

After preparation of the colloidal dispersion of selenium as disclosed herein, the dispersion is cast onto a substrate by conventional casting techniques. With respect to the utilization of these dispersions as photoconductive layers in electrophotographic applications, it is desirable to minimize the concentration of ionic domains, e.g. acidic polymers. In the embodiment in which an acidic polymer is used as the reaction site, it is desirable to dilute it as much as possible. This is accomplished by recharging the reaction vessel with hydrazine and selenous acid as many times as is necessary to form a dispersion in which the selenium is in great excess of the polymer. When a surfactant micelle is used as the reaction site, separation of the selenium from the micelle can be accomplished by ion exchange. In the case of a covalently bonded reducing agent, e.g. ascorbic acid, the acidity is such that an insulating matrix is provided thereby providing a binder layer with improved charge acceptance.

The method of practicing the present invention is further illustrated by the following examples.

EXAMPLE I

This example demonstrates the formation and growth of an aqueous colloidal dispersion of selenium particles in the size range of from 800 to 2000 Å. The formation of a stable colloidal dispersion of amorphous selenium using poly(acrylic acid) as the functional domain is described.

Procedures

Deionized water, 550 ml., is charged into a 1 liter 4-necked round bottom flask equipped with a Teflon paddle stirrer, a gas inlet tube, a graduated addition funnel and reflux condenser. Ten grams (138 meq) of poly(acrylic acid) having a molecular weight of 250,000 is added to the flask and the system purged with Argon while being gently stirred. The polymer is partially neutralized with 95% hydrazine (2.33 ml., 69.5 mmoles) and stirred for an additional 20 minutes. A solution of 95% selenous acid (9.63 gm., 69.5 mmoles) in 280 ml. of deionized water is added dropwise at ambient temperature over a 3 hour period. A ruddy red colloidal dispersion of selenium particles in water is thus obtained. The dispersion contains 1.8% non-volatile material, 35% of which is selenium. The average size of the selenium particles in the dispersion is found by transmission electron spectroscopy to be 1200 Å.

EXAMPLE II

Growth of previously nucleated selenium particles is accomplished as follows:

After removal of an aliquot of the above dispersion, a second increment of hydrazine and selenous acid is added. With approximately 600 ml. of solution remaining in the flask, it is calculated that this volume represents 104 meq. of poly(acrylic acid). Subsequently, 69.5 mmoles of hydrazine is added followed by the dropwise addition of 69.5 mmoles of selenous acid in 250 ml. of deionized water. The dispersion remains stable throughout this procedure while becoming somewhat more reddish in color. This second stage increases the percent of non-volatile material to 1.9%, 52% of which is selenium. At this point, the average size of the selenium particle has been increased to 1400 Å. The particle number remains unchanged, indicating that the reduction of the selenous acid occurs near the surface of the existing particles.

This staged addition of hydrazine and selenous acid can be continued, further increasing the non-volatile content of the dispersion and the relative fraction of selenium in the dispersion. The staging of this dispersion is continued, and in the process, the particles continue to grow and the distribution of size narrows. After the third and fourth stages the average particle size is 1700 and 1900 Å respectively.

EXAMPLE III

This example involves the reduction of selenous acid in the presence of the hydrazine salt of propionic acid and demonstrates the necessity of a functional domain such as that provided by a macromolecular polycarboxylic acid.

Deionized water (250 ml.) and propionic acid (59.32 meq.) are charged into a 500 ml. round bottom flask equipped as in Example I. Propionic acid is an appropriate model compound for the repeat unit in poly(acrylic acid), i.e. $-[CH_2-CH(COOH)]-$. The solution is purged with Ar and stirred gently for 0.25 hours. Hydrazine hydrate (95%), 29.66 moles, is then added at ambient temperature. Selenous acid (21.33 mmoles) in 50 ml. of deionized water is added over 0.25 hour at ambient temperature. A massive flocculent red-violet precipitate which settles quickly upon standing is the product of the reaction.

EXAMPLE IV

Deionized water (250 ml.) and poly(acrylic acid), K & K Chemicals (59.32 meq.), are charged into a 500 ml. round bottom flask equipped as in Example I. The solution is purged with Ar and stirred gently for 0.25 hour. Hydrazine hydrate (95%), 21.33 mmoles is then added at ambient temperature. Selenous acid (21.33 mmoles) in 50 ml. of deionized water is added over 0.25 hour at ambient temperature yielding a tomato soup red stable colloidal dispersion of amorphous selenium. The size of the particles in the dispersion ranges from 500–1000 Å. The dispersion contains 1.98% non-volatile material, 28% of which is selenium. This reaction is identical to that of Example III except that poly(acrylic acid) is substituted for propionic acid.

EXAMPLE V

In this example copoly(styrene/acrylic acid) is used in the preparation of a stable colloidal dispersion of amorphous selenium. The copolymer was prepared by the free radical copolymerization of styrene and acrylic acid in a mole ratio of 1/1. Based on the titration of the carboxylate residues, the molar composition of the resulting polymer is (0.60/0.40) styrene/acrylic acid.

Deionized water (250 ml.), ammonia (4.23 meq.) and 4 gm. (16.92 meq.) of copoly(styrene/acrylic acid) are charged to a 500 ml. round bottom flask equipped as in Example I. Hydrazine, 8.4 mmoles is added at ambient temperature. Selenous acid (8.4 mmoles) in 40 ml. of deionized water is then added dropwise over a period of 2 hours. A tomato soup red colloidal dispersion of selenium particles in water is thus obtained. The dispersion contains 1.5% non-volatile material, 14% of which is selenium.

EXAMPLE VI

Poly(2-acrylamido-2-methylpropane sodium sulfonate) (AMPS), 10 gm., 48.3 meq., and 300 ml. of deionized water are charged to a 1 liter Erlenmeyer flask whereupon an excess of Dowex 50W-X8 cation exchange resin is added in the $H^+$ form to convert the poly(AMPS-salt) to the acid. The mixture is slurried for 0.5 hour whereupon the resin beads are removed through a coarse sintered glass filter and the filtrate transferred to a 1 liter round bottom flask equipped as in Example I. The solution is purged with Ar and stirred gently for about 0.25 hour. Hydrazine (95%), 36.2 mmoles, is added at ambient temperature. Selenous acid (36.2 mmoles) in 100 ml. of deionized water is then added dropwise over about 2 hours. A dark red, stable, colloidal dispersion of amorphous selenium is thereby obtained. The dispersion is found to contain 3.1% non-volatile material, 22% of which is selenium.

EXAMPLE VII

In this example a copolymer of poly(2-acrylamido-2-methylpropane sulfonic acid) and methylmethacrylate is used as the functional domain in the preparation of a stable colloidal dispersion of amorphous selenium. The copolymerization is carried out in a dimethyl formamide solution and initiated by use of azobis 2,2'-methylpropionitrile (AIBN). The resulting polymer is precipitated in acetone/petroleum ether (¼)v and dried in vacuo. Fifteen grams of this polymer is ion exchanged against an excess of Dowex 50W-X8 in the $H^+$ form yielding 315 ml. of copolymer solution in $H_2O/MeOH_{(9/1)v}$ at a concentration of 0.042 meq. of acid per milliliter.

The polymer prepared by the foregoing procedure, 4.20 gm. (5.88 meq.) in 140 ml. of $H_2O/MeOH_{(9/1)vl}$ is charged to a 500 ml. round bottom flask equipped as in Example I. After stirring gently for about 0.25 hour, hydrazine (95%) 4.41 mmoles is added at ambient temperature. Selenous acid (4.41 mmoles) in 100 ml. of deionized water is added dropwise over about 2 hours. The reaction mixture is stirred overnight yielding a ruddy red colloidal dispersion. A sample is removed from the reaction mixture and a second increment of hydrazine (3.35 mmoles) and selenous acid (3.35 mmoles) is added. At this point, the dispersion becomes slightly more reddish in color. After addition of the second increment the dispersion contains about 1.3% non-volatile material, 12.7% of which is selenium. The size of the selenium particles in the dispersion is found to range from 800 to 1500 Å after addition of the first increment of hydrazine and from 1200 to 1800 Å after the second.

EXAMPLE VIII

In this example a micellar solution of dodecyl acid sulfate is used as the functional domain in the preparation of stable colloidal dispersions of amorphous selenium. The alkyl acid sulfate is prepared by ion exchanging sodium dodecylsulfate against an excess of Dowex 50W-X8 in the $H^+$ form.

An aqueous solution of 8.4 meq. of dodecyl acid sulfate in 100 ml. of deionized water is charged to a 250 ml. round bottom flask equipped as in Example I. The solution is purged with Ar and stirred gently for 0.25 hour. Hydrazine hydrate (86%), 6.3 mmoles, is then added at ambient temperature. The reaction mixture is then heated to 45° C. and 6.3 mmoles of selenous acid in 10 ml. of deionized $H_2O$ is added dropwise over 0.25 hour. This cycle of introducing reagents is repeated seven times adding a total of 36.37 meq. of selenous acid. Samples are taken after the addition of each increment of selenous acid. The composition after addition of the final increment is about 3.3% non-volatile material with selenium comprising over 57% by weight of the non-volatile fraction.

After addition of the first increment of hydrazine hydrate, a polydispersed system having particle sizes of from 250 to 1500 Å is observed. The average particle size increases slightly and the distribution narrows with the addition of later increments, e.g. after addition of the seventh increment, the particles range in size from 1000 to 1500 Å.

EXAMPLE IX

In this example the preparation of Se° dispersions in non-aqueous media by the reduction of dimethylselenite in a cellosolve solution is demonstrated.

Copoly(styrene/acrylic acid), 2.0 gm. (4.4 meq. acid) is dissolved in 100 ml. of cellosolve (ethylene glycol monomethyl ether) solvent and charged to a 250 ml. 3-necked round bottom flask equipped as in Example I. The solution is purged with Ar and stirred gently for 0.25 hour. Hydrazine (95%), 1.65 mmoles, is then added at ambient temperature. Dimethylselenite (1.65 mmoles) in 5 ml. of cellosolve is added dropwise and the reaction mixture stirred for 2 hours. The dispersion at this time is a colloidal reddish brown red material containing 2.1% non-volatile material, 14% of which is Se. After addition of the first increment, electron microscopy shows agglomerates (1500–4500 Å) of individual particles having diameters in the range of from 500 Å to 1000 Å. On aging for 20 hours, the agglomerates coalesce to form particles of from 1500 to 4500 Å in diameter.

A second increment of hydrazine and dimethylselenite (1.25 mmoles) is added in a similar fashion. The addition of this increment results in a dispersion of 2000–5000 Å particles that slowly settles on standing. The stability of these dispersions can be considerably enhanced by the addition of appropriate stabilizing polymers, such as block copolymers of styrene and ethylene oxide or styrene/acrylic acid copolymers.

What is claimed is:

1. A method of forming a stable, colloidal dispersion of selenium which comprises:
    (a) providing a solution of a solvent containing submicron domains of a soluble second phase, the domains being comprised of a hydrazine substituted poly (acrylic acid) and being capable of reducing selenous acid or alkyl selenite to selenium;
    (b) adding selenous acid or an alkyl selenite corresponding to the following formula:

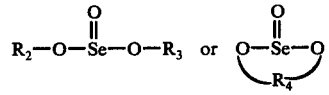

wherein $R_2$ and $R_3$ are independently H or alkyl of 1 to 20 carbon atoms and $R_4$ is an alkylene radical of 1 to 20 carbon atoms, to the solution to reduce the selenium in the selenous acid or alkyl selenite to zero valent selenium and thereby form the colloidal dispersion of selenium.

2. The method of claim 1 wherein the second phase is a hydrazine substituted poly(acrylic acid).

3. A method of forming a stable, colloidal dispersion of selenium which comprises:
    (a) providing a solution of a solvent containing submicron domains of a soluble second phase, the domains being comprised of a hydrazine substituted copolymer of (styrene/acrylic acid), or a copolymer of (styrene/methacrylic acid) and said domains being capable of reducing selenous acid or alkyl selenite to selenium;

(b) adding selenous acid or an alkyl selenite corresponding to the following formula:

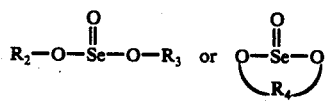

wherein $R_2$ and $R_3$ are independently H or alkyl of 1 to 20 carbon atoms and $R_4$ is an alkylene radical of 1 to 20 carbon atoms to the solution to reduce the selenium in the selenous acid or alkyl selenite to zero valent selenium and thereby form the colloidal dispersion of the selenium.

4. A method of forming a stable, colloidal dispersion of selenium which comprises:

(a) providing a solution of a solvent containing submicron domains of a soluble second phase, the domains being comprised of a homo or copolymer of an unsaturated carboxylic acid, and said domains being capable of reducing selenous acid or alkyl senenite to selenium;

(b) adding selenous acid or an alkyl selenite corresponding to the following formula:

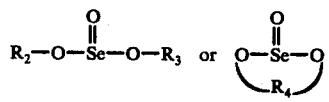

wherein $R_2$ and $R_3$ are independently H or alkyl of 1 to 20 carbon atoms and $R_4$ is an alkylene radical of 1 to 20 carbon atoms, to the solution to reduce the selenium in the selenous acid or alkyl selenite to zero valent selenium and thereby form the colloidal dispersion of the selenium.

5. The method of claim 4 wherein the soluble second phase is a homo or copolymer of an unsaturated carboxylic acid.

6. A method of forming a stable, colloidal dispersion of selenium which comprises:

(a) providing a solution of a solvent containing submicron domains of a soluble second phase, the domains being comprised of a hydrazine substituted poly(2-methyl-2-acrylamido propane-sulfonic acid), p-styrene sulfonic acid or vinyl sulfonic acid, and said domains being capable of reducing selenous acid or alkyl selenite to selenium;

(b) adding selenous acid or an alkyl selenite corresponding to the following formula:

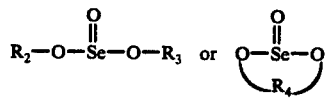

wherein $R_2$ and $R_3$ are independently H or alkyl of 1 to 20 carbon atoms and $R_4$ is an alkylene radical of 1 to 20 carbon atoms, to the solution to reduce the selenium in the selenous acid or alkyl selenite to zero valent selenium and thereby form the colloidal dispersion of the selenium.

* * * * *